(12) United States Patent
Ye

(10) Patent No.: US 9,544,815 B2
(45) Date of Patent: Jan. 10, 2017

(54) METHOD OF PERFORMING TRAFFIC STEERING IN A WIRELESS NETWORK SYSTEM AND RELATED WIRELESS NETWORK SYSTEM

(71) Applicant: ACER INCORPORATED, New Taipei (TW)

(72) Inventor: Shiang-Rung Ye, New Taipei (TW)

(73) Assignee: ACER INCORPORATED, New Taipei (TW)

(*) Notice: Subject to any disclaimer, the term of this patent is extended or adjusted under 35 U.S.C. 154(b) by 159 days.

(21) Appl. No.: 14/462,547

(22) Filed: Aug. 18, 2014

(65) Prior Publication Data

US 2015/0215820 A1 Jul. 30, 2015

Related U.S. Application Data

(60) Provisional application No. 61/932,802, filed on Jan. 29, 2014, provisional application No. 61/939,746, filed on Feb. 14, 2014.

(51) Int. Cl.
*H04W 28/08* (2009.01)
*H04W 40/04* (2009.01)
(Continued)

(52) U.S. Cl.
CPC ............ *H04W 28/08* (2013.01); *H04L 47/122* (2013.01); *H04W 40/04* (2013.01); *H04L 45/22* (2013.01)

(58) Field of Classification Search
None
See application file for complete search history.

(56) References Cited

U.S. PATENT DOCUMENTS 8,451,804 B2   5/2013   Vujcic
8,743,696 B2 * 6/2014   Chowdhury ............ H04L 45/04
                                                        370/237
(Continued)

FOREIGN PATENT DOCUMENTS

WO   2013042330 A1   3/2013

OTHER PUBLICATIONS

Interworking between Next Generation Fixed and 3GPP Wireless Access, SA WG2 Meeting #S2-87, S2-113892, WT-203, Oct. 10-14, 2011, pp. 1-57, Revision: 09, XP050549084, The Broadband Forum, Jeju Island, South Korea.
(Continued)

*Primary Examiner* — Donald Mills
(74) *Attorney, Agent, or Firm* — Winston Hsu; Scott Margo

(57) ABSTRACT

A wireless network system includes a base station of a first network and a user equipment camping on the first network. The base station is configured to set an indicator to a specific value when determining that the first network is not loaded balancedly. The base station then sends the indicator, an update amount, a timer length, and at least one RAN rule including a threshold to the user equipment. The user equipment is configured to start a timer when receiving the at least one RAN rule with the indicator set to the specific value from the base station, adjust the threshold by the update amount when the timer expires according to the timer length, and steer traffic from the first network to a second network or from the second network to the first network when the at least one RAN rule is satisfied according to the adjusted threshold.

9 Claims, 3 Drawing Sheets

(51) Int. Cl.
*H04L 12/803* (2013.01)
*H04L 12/707* (2013.01)

(56) References Cited

U.S. PATENT DOCUMENTS

| | | | | |
|---|---|---|---|---|
| 9,210,613 | B2* | 12/2015 | Tipton | H04W 28/08 |
| 2002/0137518 | A1* | 9/2002 | Achour | H04W 16/06 |
| | | | | 455/447 |
| 2008/0298325 | A1 | 12/2008 | Vujcic | |
| 2010/0255846 | A1* | 10/2010 | Vikberg | H04J 11/0069 |
| | | | | 455/436 |
| 2011/0199905 | A1* | 8/2011 | Pinheiro | H04W 4/005 |
| | | | | 370/235 |
| 2012/0039175 | A1* | 2/2012 | Sridhar | H04L 47/125 |
| | | | | 370/236 |
| 2012/0202491 | A1* | 8/2012 | Fox | H04B 7/2609 |
| | | | | 455/435.1 |
| 2013/0189991 | A1 | 7/2013 | Rose | |
| 2013/0242777 | A1* | 9/2013 | Choi | H04W 72/0453 |
| | | | | 370/252 |
| 2013/0310043 | A1* | 11/2013 | Bakker | H04W 36/22 |
| | | | | 455/436 |
| 2014/0003239 | A1 | 1/2014 | Etemad | |
| 2014/0133294 | A1 | 5/2014 | Horn | |
| 2014/0213277 | A1 | 7/2014 | Jang | |
| 2015/0103657 | A1* | 4/2015 | Henderson | H04W 36/0083 |
| | | | | 370/232 |
| 2015/0358884 | A1* | 12/2015 | Nagasaka | H04W 36/22 |
| | | | | 370/230 |

OTHER PUBLICATIONS

John L. Tomici et al., Multi-RAT Traffic Offloading Solutions for the Bandwidth Crunch Problem, 2011, XP031880722, IEEE.

* cited by examiner

METHOD OF PERFORMING TRAFFIC STEERING IN A WIRELESS NETWORK SYSTEM AND RELATED WIRELESS NETWORK SYSTEM

CROSS REFERENCE TO RELATED APPLICATIONS

This application claims the benefit of U.S. provisional application No. 61/932,802 filed on Jan. 29, 2014 and U.S. provisional application No. 61/939,746 filed on Feb. 14, 2014.

BACKGROUND OF THE INVENTION

1. Field of the Invention

The present invention is related to a method of performing traffic steering in a wireless network system, and more particularly, to a method of performing high efficient and real-time traffic steering in a wireless network system.

2. Description of the Prior Art

With rapid development in technology, a user may easily connect to a network using desktop computers, notebook computers, personal digital assistants (PDAs) or smart phones. As successive generations of operating standards proliferate, a wireless device is sometimes constructed to be operable in conformity with multiple communication standards associated with a single radio communication system-type or multiple communication system-types. For instance, a multi-mode device may provide a user with the capability of communicating with an Internet Protocol (IP)-based radio network and a 3rd Generation Partnership Project (3GPP)-based cellular network.

According to relevant 3GPP specifications (such as TS. 34.108), a base station is configured to broadcast various system information blocks to a user equipment (UE). System information block type 1 (SIB1) contains cell access related information when evaluating if a user equipment is allowed to access a cell, such as public land mobile network (PLMN) identity list, tracking area code, cell identity, information for cell selection, maximum power value (p-Max), frequency band indicator, scheduling information, time division duplex (TDD) configuration, system information window length and system information value tag. In a wireless network system, radio access network (RAN) rules associated with interworking between a 3GPP-based network and an IP-based network are included in a system information block type 17 (SIB17). SIB1 uses a fixed schedule with a periodicity of 80 ms and repetitions made within 80 ms. Upon receiving the SIB1 message, the user equipment can decide how to access the SIB17 message. Based on the RAN rule, the user equipment may perform traffic steering between the 3GPP-based network and the IP-based network, such as data offloading from the 3GPP-based network to the IP-based network. If it is determined that the 3GPP-based network is still overloaded, the base station is configured to update the threshold of the RAN rule in SIB17 and notify the user equipment to read the updated SIB17 message in SIB1 for encouraging the user equipment to steer traffic from the 3GPP-based network.

In the prior art traffic steering method, the efficiency of the base station may be influenced when the threshold of the RAN rule needs to be updated many times before a congested network is sufficiently offloaded. The user equipment is required to read both SIB1 and SIB17 each time when the threshold of the RAN rule is updated. Also, since the user equipment user only reads SIB1 periodically, it may not be able to immediately respond to any update made to the RAN rule. Therefore, there is a need for a method of performing high efficient and real-time traffic steering in a wireless network system.

SUMMARY OF THE INVENTION

The present invention provides a method of performing traffic steering in a wireless network system having a base station of a first network and a user equipment camping on the first network. The method includes the base station setting an indicator to a first value when determining that the first network is not loaded balancedly or setting the indicator to a second value when determining that the first network is loaded balancedly; the base station sending the indicator, an update amount, a timer length, and at least a first RAN rule including a first threshold to the user equipment; the user equipment starting a timer when receiving the first RAN rule with the indicator set to the first value from the base station; the user equipment adjusting the first threshold by the update amount when the timer expires according to the timer length; and the user equipment steering traffic from the first network to a second network or from the second network to the first network when the first RAN rule is satisfied according to the adjusted first threshold.

The present invention also provides a wireless network system which performs traffic steering. The wireless network system includes a first network, a second network, and a user equipment. The first network includes a base station configured to set an indicator to a first value when determining that the first network is not loaded balancedly or set the indicator to a second value when determining that the first network is loaded balancedly; and transmit the indicator, an update amount, a timer length, and at least one RAN rule including a threshold. The user equipment is currently camping on the first network and configured to start a timer when receiving the at least one RAN rule with the indicator set to the first value from the base station; adjust the threshold by the update amount when the timer expires according to the timer length; and steer traffic from the first network to the second network or from the second network to the first network when the first RAN rule is satisfied according to the adjusted threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
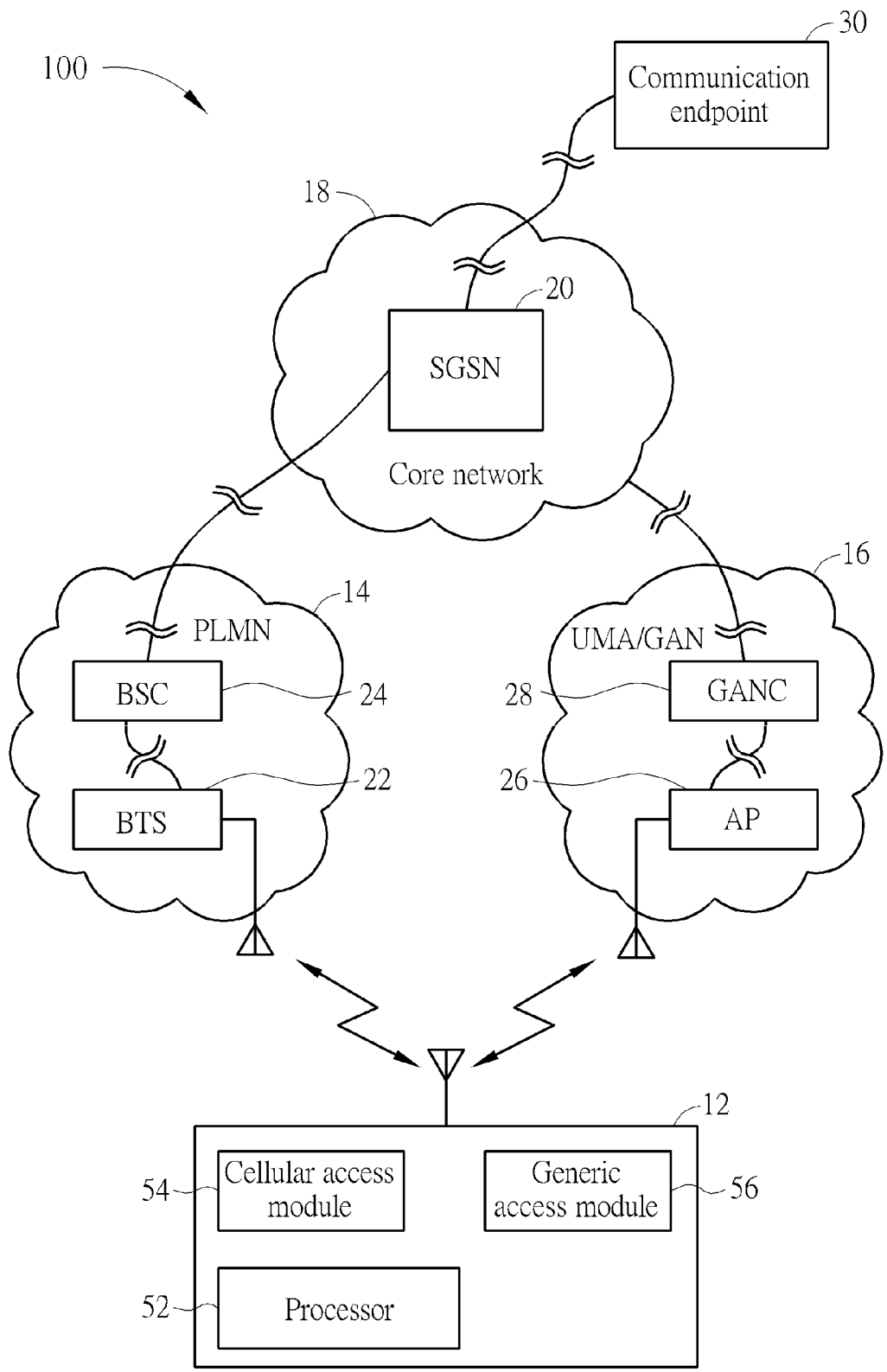
FIG. 1 is a diagram illustrating a wireless network system configured to perform high efficient and real-time traffic steering according to an embodiment of the present invention.

FIG. 1 is a diagram illustrating a wireless network system 100 configured to perform high efficient and real-time traffic steering according to an embodiment of the present invention. The wireless network system 100 includes one or multiple wireless devices (only one wireless device 12 is shown), a PLMN 14 and an unlicensed mobile access/ generic access network (UMA/GAN) 16, a core network 18 and a communication endpoint 30. The PLMN 14 may be representative of any 3GPP-based cellular network including, but not limited to, 2G, 2.5G, 3G or 4G network. The UMA/GAN 16 may be representative of any IP-based radio network including, but not limited to, a wireless local area network (WLAN) or a wireless fidelity (Wi-Fi) network.

The PLMN 14 and the UMA/GAN 16 are coupled in communication connectivity by way of the core network 18. The core network 18 includes a serving general packet radio service support node (SGSN) 20 which is responsible for the delivery of data packets from and to the wireless devices within its geographical service area. In conformity with the 3GPP network structure, the PLMN 14 is shown to include a base transceiver station (BTS) 22 and a base station controller (BSC) 24, while the UMA/GAN 16 is shown to include an access point (AP) 26 and a GAN controller (GANC) 28, also sometimes referred to as a UMA/GAN network controller (UNC). Noteworthily, the 2G-based BTS 22 and the BSC 24 may be substituted by their 3G-based equivalences of a NODE B and a radio network controller (RNC), respectively, or by their 4G-based equivalence of an e-NODE B. The communication endpoint 30 may be representative of any of various data destinations forming communication nodes used in performance of a communication service.

The user equipment 12 includes a processor 52, a cellular access module 54 and a generic access module 56. The user equipment 12 may register on the PLMN 14 using the cellular access module 54 and/or register on the UMA/GAN 16 using the generic access module 56, thereby providing dual-mode operation. Also, the processor 52 is configured to control data loading between the PLMN 14 and the cellular access module 54 and between the UMA/GAN 16 and the generic access module 56 according to one or multiple RAN rules received from the PLMN 14 or the UMA/GAN 16. The detailed operation of the user equipment 12 when performing the present traffic steering method will be described in subsequent paragraphs.

In the present invention, the wireless device 12 or the communication endpoint 30 may include multi-mode transportable electronic devices such as mobile telephones, personal digital assistants, handheld, tablet, nettop, or laptop computers, or other devices with similar telecommunication and interworking capabilities. In other cases, the wireless device 12 or the communication endpoint 30 may include multi-mode non-transportable devices with similar telecommunications and interworking capabilities, such as desktop computers, set-top boxes, or network appliances. The PLMN 14 and the UMA/GAN 16 are configured to provide local coverage (an area where the wireless device 12 or the communication endpoint 30 can work) for the wireless network system 100. However, the types of the wireless device 12, the communication endpoint 30, the PLMN 14 and the UMA/GAN 16 do not limit the scope of the present invention.

Figure 2:
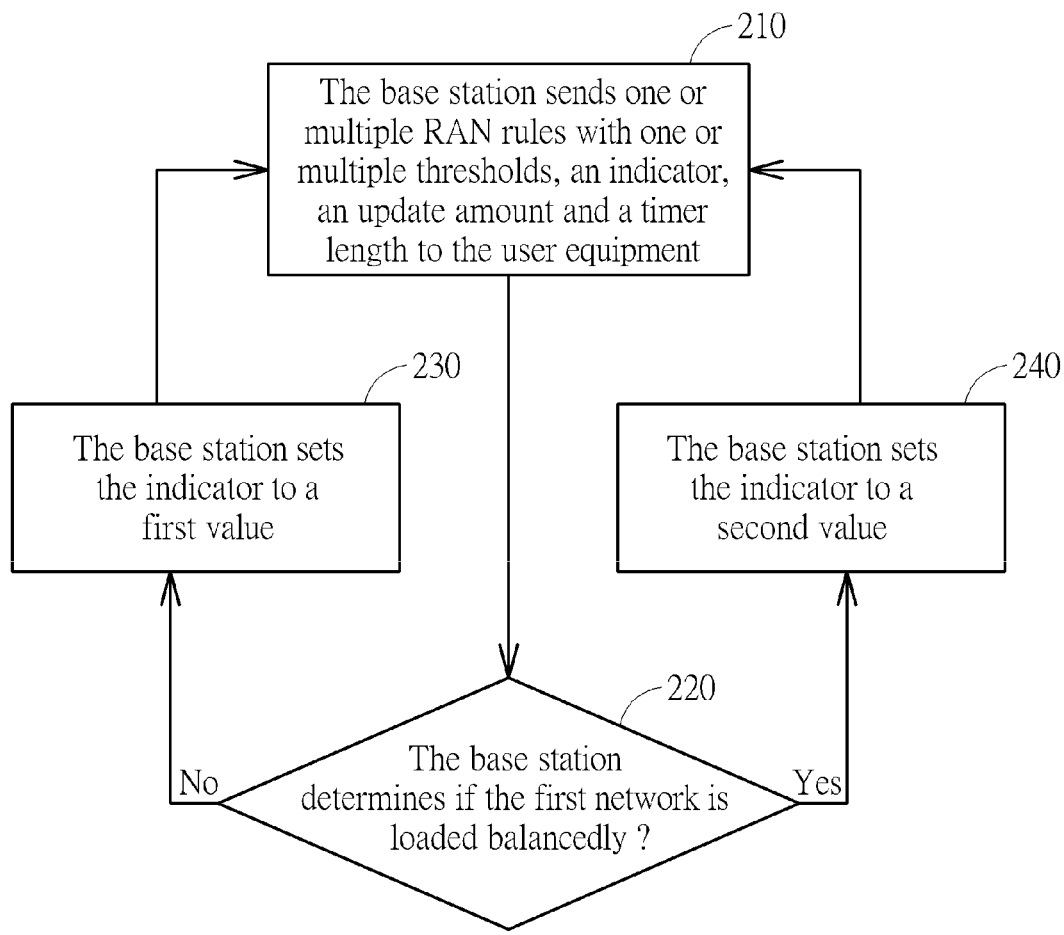
FIGS. 2 and 3 are flowcharts illustrating a method of performing high efficient and real-time traffic steering in a wireless network system according to an embodiment of the present invention.
Figure 3:
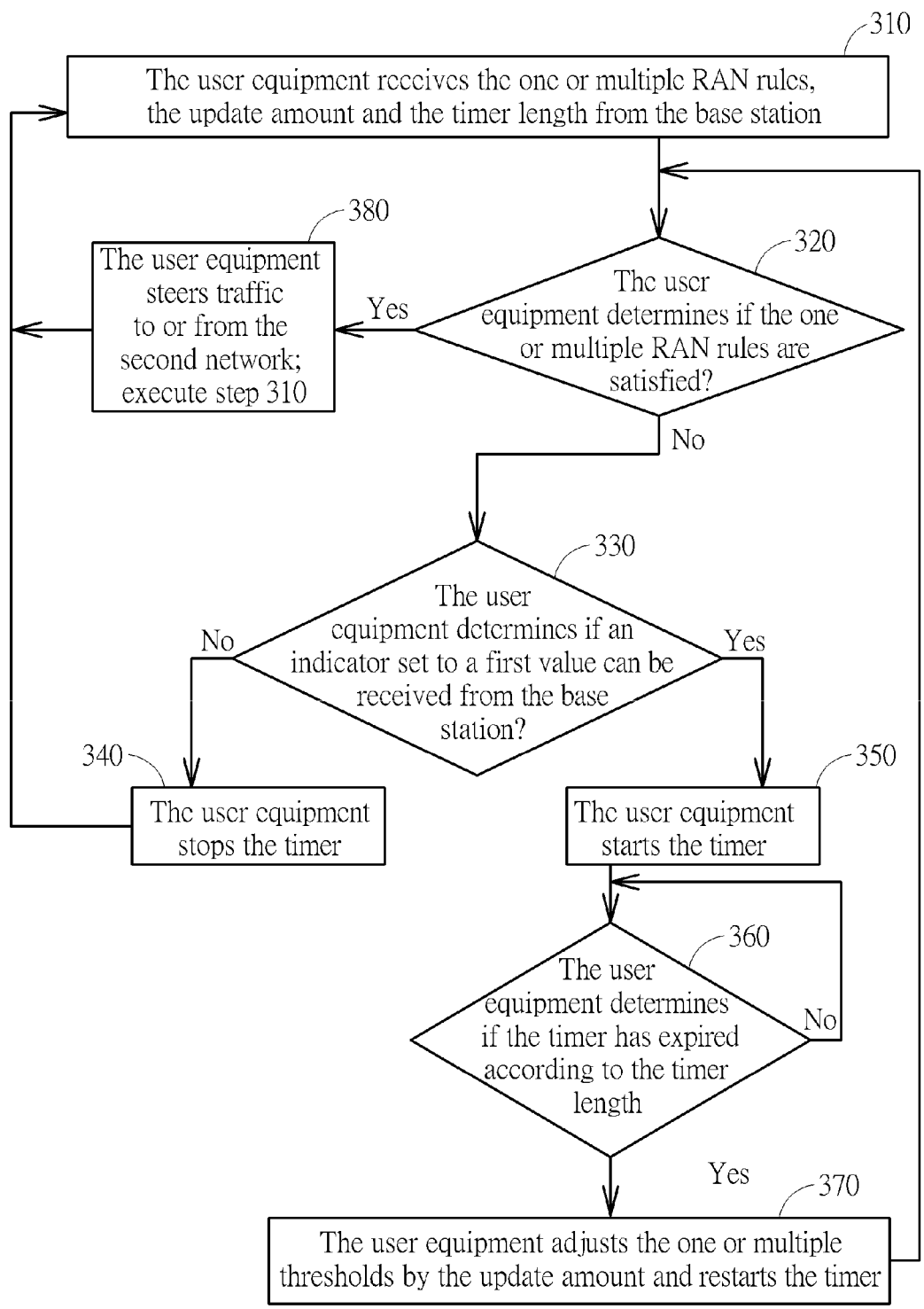

FIGS. 2 and 3 are flowcharts illustrating a method of performing high efficient and real-time traffic steering in a wireless network system according to an embodiment of the present invention. FIG. 2 illustrates the operation of a base station in the wireless network system 100, such as a 2G-based BTS, a 3G-based NODE B or a 4G-based e-NODE B in the 3GPP-based PLMN 14, or the IP-based UMA/GAN 16. FIG. 3 illustrates the operation of a user equipment in the wireless network system 100, such as that of the multi-mode wireless device 12. The user equipment, capable of registering on at least a first network and a second network, is currently camping on the first network. The first network may be the 3GPP-based PLMN 14 and the second network may be the IP-based UMA/GAN 16, or vice versa.

The method depicted in FIG. 2 includes the following steps:

Step 210: the base station sends one or multiple RAN rules with one or multiple thresholds, an indicator, an update amount and a timer length to the user equipment; execute step 220.

Step 220: the base station determines if the first network is loaded balancedly; if yes, execute step 240; if no, execute step 230.

Step 230: the base station sets the indicator to a first value; execute step 210.

Step 240: the base station sets the indicator to a second value; execute step 210.

The method depicted in FIG. 3 includes the following steps:

Step 310: the user equipment receives the one or multiple RAN rules, the update amount and the timer length from the base station; execute step 320.

Step 320: the user equipment determines if the one or multiple RAN rules are satisfied; if yes, execute step 380; if no, execute step 330.

Step 330: the user equipment determines if an indicator set to a first value can be received from the base station; if yes, execute step 350; if no, execute step 340.

Step 340: the user equipment stops the timer; execute step 310.

Step 350: the user equipment starts the timer; execute step 360.

Step 360: the user equipment determines if the timer has expired according to the timer length; if yes, execute step 370; if no, execute step 360.

Step 370: the user equipment adjusts the one or multiple thresholds by the update amount and restarts the timer; execute step 320.

Step 380: the user equipment steers traffic to or from the second network; execute step 310.

In step 210, the base station is configured to send one or multiple RAN rules with one or multiple thresholds, the indicator, the update amount (represented by $\Delta_{TH}$) and the timer length to the user equipment. Each RAN rule may be associated with parameters used to evaluate the signal quality of the first network which the user equipment is currently camping on, such as RSRP (reference signal receiving power), RSRQ (reference signal receiving quality), CPICH RSCP (common pilot channel received signal code power), CPICH EC/No (common pilot channel energy per chip over the noise), RSSI (received signal strength indicator), RCPI (received channel power indicator), or BSS (basic service set) load.

Some examples of the one or multiple RAN rules in step 210 are shown following this paragraph. M-RSRP and M-RSSI represent the RSRP and RSSI measured by the user equipment when camping on the first network. $T_1$-$T_4$ represent the thresholds sent by the base station. However, the type and number of the RAN rule do not limit the scope of the present invention.

Example 1: $M_{RSRP} > T_1$
Example 2: $M_{RSRP} > T_1$ and $M_{RSSI} > T_2$
Example 3: $M_{RSRP} < T_3$ or $M_{RSSI} < T_4$ In the present invention, the base station is configured to send the one or multiple RAN rules, the indicator, the update amount and the timer length to the user equipment via dedicated or broadcast signaling, such as via radio resource control (RRC) messages, paging messages, master information blocks (MIBs) or SIBs, separately, together, simultaneously or periodically. However, the method of sending the one or multiple RAN rules, the indicator, the update amount and the timer length does not limit the scope of the present invention.

In an embodiment of the present invention, each indicator includes at least one bit. If it is determined in step 220 that the first network is over-loaded or under-loaded, the indicator is set to the first value (such as logic 1) in step 230; if it is determined in step 220 that the first network is balancedly loaded, the indicator is set to the second value (such as logic 0) in step 240. The indicator set to the first value means that the loading of the first network still needs to be balanced, and the corresponding operation of the user equipment will be described in detail in subsequent paragraphs.

For illustrative purpose, assume that the user receives one RAN rule with one threshold $T_0$ from the base station in step 310. In step 320, it is determined if the RAN rule is satisfied when camping on the first network. More specifically, the threshold of the initial value $T_0$ received from the base station is used to evaluate the signal quality of the first network. In an embodiment when the RAN rule is associated with RSRP, the user equipment may determine that the RAN rule is satisfied when the RSRP measured by the user equipment is below $T_0$ in a first scenario, or when the RSRP measured by the user equipment is above $T_0$ in a second scenario.

The first scenario means that the performance of the first network has downgraded to a certain degree, possibly due to overloading. In response, the user equipment may steer traffic from the first network to the second network in step 380, thereby balancing data loading of the first and second networks. The second scenario means that the first network is able to handle more tasks. In response, the user equipment may steer traffic from the second network to the first network in step 380, thereby balancing data loading of the first and second networks.

After the user equipment steers traffic to or from the second network in step 380, the base station may determine that the first network becomes balancedly loaded in step 220, thus setting the indicator to the second value in step 210. In this case, it can be determined in step 330 that the indicator (if any) received from the base station is not set to the first value. In response, the user equipment is configured stop the timer in step 340 (note that the timer may or may not be running when step 320 is being executed) and) before looping back to step 310.

However, after the user equipment steers traffic to or from the second network in step 380, the base station may determine that the first network is still not balancedly loaded in step 220, thus setting the indicator to the first value in step 210. In this case, it may be determined in step 330 that the indicator received from the base station is set to the first value. In response, the user equipment is configured start the timer in step 350 (note that the timer may or may not be running when step 320 is being executed).

Next in steps 360 and 370, the user equipment is configured to adjust the threshold by the update amount $\Delta_{TH}$ when the timer expires according to the timer length received in step 310. In other words, the threshold for determining if the RAN rule is satisfied is updated before looping back to step 320.

The overall operation of the user equipment when performing the present method is illustrated hereafter. At the first execution of step 320, the threshold of the initial value $T_0$ received from the base station is used to evaluate the signal quality of the first network. If the RAN rule is not satisfied according to the threshold of the initial value $T_0$, the user equipment is configured to adjust the threshold from the current value $T_0$ to an updated value $T_1$ ($T_1=T_0+\Delta_{TH}$) and the adjusted threshold $T_1$ is used to evaluate the signal quality of the first network at the $2^{nd}$ execution of step 320. Similarly, at the $n^{th}$ execution of step 320, if it is determined that the RAN rule is not satisfied according to the current value $T_{n-1}$, the user equipment is configured to adjust the threshold from the current value $T_{n-1}$ to an updated value $T_n$ ($T_n=T_{n-1}+\Delta_{TH}$) and the adjusted threshold $T_n$ is used to evaluate the signal quality of the first network at the $(n+1)^{th}$ execution of step 320, wherein n is an integer larger than 1.

In an embodiment after the user equipment has adjusted the threshold to $T_n$, the base station may determine that the first network is balancedly loaded in step 220, thus setting the indicator to the second value in step 240. Afterwards, the present invention may loop back to step 310. The adjustment of threshold from $T_1$-$T_n$ is automatically performed by the user equipment according to the value of the indicator, which does not influence the efficiency of the base station.

As previously stated, the base station may send the one or multiple RAN rules by broadcasting SIB17 and send the indicator by broadcasting SIB1 or via an RRC/paging message in step 210. After reading the SIB1 message or the RRC/paging massage notifying that the indicator is set to the first value, the user equipment only needs to access the SIB17 message once for automatically adjusting the threshold from $T_1$-$T_n$, instead of accessing both the SIB1 and SIB17 messages n times for receiving the updated values $T_1$-$T_n$ of the threshold.

In the present invention, the base station can operate with high efficiency since the user equipment is configured to automatically adjust one or multiple thresholds of one or multiple RAN rules. Also, since the indicator may be transmitted via dedicated signaling, the user equipment is able to immediately respond to any update made to the one or multiple RAN rules. Therefore, the present invention can provide a method of performing high efficient and real-time traffic steering in a wireless network system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing traffic steering in a wireless network system having a base station of a first network and a user equipment camping on the first network, comprising:
    the base station setting an indicator to a first value when determining that the first network is not loaded balancedly or setting the indicator to a second value when determining that the first network is loaded balancedly;
    the base station sending the indicator, an update amount, a timer length, and at least a first radio access network (RAN) rule including a first threshold to the user equipment, wherein the update amount has a constant value larger than zero and a value of the timer length is larger than zero;
    the user equipment starting a timer when receiving the first RAN rule with the indicator set to the first value from the base station;
    the user equipment adjusting the first threshold by the update amount when the timer expires according to the timer length; and the user equipment steering traffic from the first network to a second network or from the second network to the first network when the first RAN rule is satisfied according to the adjusted first threshold.

2. The method of claim 1, wherein all of the indicator, the update amount, the timer length and the first RAN rule are transmitted via a radio resource control (RRC) message, a paging message, a master information block (MIB), or a system information block (SIB).

3. The method of claim 1, wherein:
the indicator, the update amount and the timer length are transmitted via an RRC message or a paging message; and
the first RAN rule is transmitted via an MIB or an SIB.

4. The method of claim 1, wherein the first RAN rule is associated with a reference signal receiving power (RSRP), a reference signal receiving quality (RSRQ), a common pilot channel received signal code power (CPICH RSCP), a common pilot channel energy per chip over the noise (CPICH EC/No), a received signal strength indicator (RSSI), a received channel power indicator (RCPI), or a basic service set (BSS) load measured by the user equipment.

5. The method of claim 1, further comprising:
the user equipment resetting the timer when receiving the indicator set to the second value from the base station; and
the user equipment steering traffic from the first network to the second network or from the second network to the first network when the first RAN rule is satisfied according to the first threshold.

6. The method of claim 1, further comprising:
the base station sending a second RAN rule including a second threshold to the user equipment;
the user equipment starting a timer when receiving the second RAN rule with the indicator set to the first value from the base station;
the user equipment adjusting the second threshold by the update amount when the indicator is set to the first value and the timer expires according to the timer length; and
the user equipment steering traffic from the first network to the second network or from the second network to the first network when the first RAN rule is satisfied according to the adjusted first threshold and the second RAN rule is satisfied according to the adjusted second threshold.

7. The method of claim 1, further comprising:
the base station sending a second RAN rule including a second threshold to the user equipment;
the user equipment starting a timer when receiving the second RAN rule with the indicator set to the first value from the base station;
the user equipment adjusting the second threshold by the update amount when the indicator is set to the first value and the timer expires according to the timer length; and
the user equipment steering traffic from the first network to the second network or from the second network to the first network when the first RAN rule is satisfied according to the adjusted first threshold or the second RAN rule is satisfied according to the adjusted second threshold.

8. A wireless network system which performs traffic steering, comprising:
a first network including a base station configured to:
set an indicator to a first value when determining that the first network is not loaded balancedly or set the indicator to a second value when determining that the first network is loaded balancedly; and
transmit the indicator, an update amount, a timer length, and at least one RAN rule including a threshold, wherein the update amount has a constant value larger than zero and a value of the timer length is larger than zero;
a second network; and
a user equipment currently camping on the first network and configured to:
start a timer when receiving the at least one RAN rule with the indicator set to the first value from the base station;
adjust the threshold by the update amount when the timer expires according to the timer length; and
steer traffic from the first network to the second network or from the second network to the first network when the first RAN rule is satisfied according to the adjusted threshold.

9. The wireless network system of claim 8, wherein the first network is a 3rd Generation Partnership Project (3GPP)-based cellular network and the second network is an Internet Protocol (IP)-based radio network.

* * * * *